United States Patent
Mukherjee et al.

(10) Patent No.: US 8,948,748 B2
(45) Date of Patent: Feb. 3, 2015

(54) SCP GUIDED CAMEL TRANSACTION CONTROL DURING MTRR

(75) Inventors: Probal Mukherjee, Plano, TX (US); Khurram Ilyas, Plano, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 336 days.

(21) Appl. No.: 13/276,934

(22) Filed: Oct. 19, 2011

(65) Prior Publication Data
US 2012/0309392 A1   Dec. 6, 2012

Related U.S. Application Data

(60) Provisional application No. 61/493,551, filed on Jun. 6, 2011.

(51) Int. Cl.
| | |
|---|---|
| H04W 4/00 | (2009.01) |
| H04W 40/00 | (2009.01) |
| H04Q 3/00 | (2006.01) |
| H04W 76/00 | (2009.01) |
| H04W 88/18 | (2009.01) |
| H04W 92/24 | (2009.01) |

(52) U.S. Cl.
CPC ............. *H04Q 3/0029* (2013.01); *H04W 76/00* (2013.01); *H04W 88/18* (2013.01); *H04W 92/24* (2013.01); *H04Q 2213/13098* (2013.01); *H04Q 2213/13345* (2013.01)
USPC ........................................ 455/432.1; 455/445

(58) Field of Classification Search
CPC .. H04W 36/12; H04W 76/027; H04W 76/064
USPC ................................ 455/432.1, 417, 433, 450
See application file for complete search history.

(56) References Cited

U.S. PATENT DOCUMENTS

2008/0112395 A1*   5/2008  Zhu et al. ....................... 370/352
2011/0306331 A1*  12/2011  Gupta et al. ................... 455/418

OTHER PUBLICATIONS

3GPP TS 29.002 v.11.0.0 (Sep. 2011) 3rd Generation Partnership Project; Technical Specification Group Core Network and Terminals; Mobile Application Part (MAP) specification (Release 11).
3GPP TS 23.272 v.10.5.0 (Sep. 2011): 3rd Generation Partnership Project; Technical Specification Group Services and System Aspects; Circuit Switched (CS) fallback in Evolved Packet System (EPS); Stage 2 (Release 10).
3GPP TS 23.078 v11.0.0 (Sep. 2011): 3rd Generation Partnership Project; Technical Specification Group Core Network and Terminals; Customized Applications for Mobile Network Enhanced Logic (CAMEL) Phase 4; Stage 2 (Release 11).

* cited by examiner

*Primary Examiner* — George Eng
*Assistant Examiner* — Nam Huynh

(57) ABSTRACT

An SCP of a telecommunications network having a GMSC includes a network interface unit of the SCP that receives a CAMEL transaction from the GMSC. The SCP includes a processing unit, of the SCP, which controls the CAMEL transaction relinquished by the GMSC and decides whether or not to idle the CAMEL transaction during MTRR. A method for guiding a CAMEL transaction by an SCP during MTRR having the steps of receiving at a network interface unit of the SCP a CAMEL transaction from a GMSC. There is the step of deciding by a processing unit of the SCP which controls the CAMEL transaction relinquished by the GMSC whether or not to idle the CAMEL transaction during MTRR.

12 Claims, 1 Drawing Sheet

SCP GUIDED CAMEL TRANSACTION CONTROL DURING MTRR

CROSS REFERENCE TO RELATED APPLICATIONS

This application claims the benefit of U.S. Provisional Application No. 61/493551, filed Jun. 6, 2011, the disclosure of which is incorporated herein by reference.

TECHNICAL FIELD

The present invention is related to guiding a CAMEL transaction by an SCP during MTRR. (As used herein, references to the "present invention" or "invention" relate to exemplary embodiments and not necessarily to every embodiment encompassed by the appended claims.) More specifically the present invention is related to guiding a CAMEL transaction by an SCP during MTRR which controls the CAMEL transaction relinquished by a GMSC and decides whether or not to idle the CAMEL transaction during MTRR.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Today MTRR and CAMEL interaction is handled by the 3GPP specifications by idling the CAMEL terminating transaction and restarting it. The idea of this invention is to relinquish control of the CAMEL transaction to the SCP and let the SCP decide whether to idle it or not. This proposal also rectifies the way MTRR encountering is reported to the SCP by reporting EDP-Abandon which is almost dedicated to the originator's behavior of prematurely idling the call.

Today the CAMEL transaction is terminated due to MTRR interaction and restarted stating that the mobile subscriber might need to have the trigger happen again due to the change of location of the subscriber.

Problems with the existing solution include:
1. An EDP (event detection point) is used to terminate the relationship which is not very appropriate. EDP-Abandon is used. But EDP-abandon pertains to the originator hanging up in the context of CAMEL triggers.
2. The whole transaction is idled without any consideration given to the fact if the service running is a location sensitive service or not.
3. This can result in certain call architectures to create a lot of basic call state machines between the first triggering call model and the next triggering call model, although it is for the same party.
4. The creation of additional call models can result in the generation of redundant billing.
5. The same call reference number can be reused and thus correlate all the billing between the previous terminating MSC, the new terminating MSC and the GMSC.
6. For service interactions like caller ring back, the sequence of ringing, silence (or generic ringing) and then personalized ringing again can convey mixed feelings about the call status to the caller who might inadvertently hang up.

BRIEF SUMMARY OF THE INVENTION

The present invention pertains to a Service Control Point (SCP) of a telecommunications network having a Gateway Mobile Switching Centre (GMSC). The SCP comprises a network interface unit of the SCP that receives a Customized Application for Mobile Enhanced Logic (CAMEL) transaction from the GMSC. The SCP comprises a processing unit of the SCP which controls the CAMEL transaction relinquished by the GMSC and decides whether or not to idle the CAMEL transaction during Mobile Terminated Roaming Retry (MTRR).

The present invention pertains to a method for guiding a CAMEL transaction by an SCP during MTRR. The method comprises the steps of receiving at a network interface unit of the SCP a CAMEL transaction from a GMSC. There is the step of deciding by a processing unit of the SCP which controls the CAMEL transaction relinquished by the GMSC whether or not to idle the CAMEL transaction during MTRR.

BRIEF DESCRIPTION OF THE DRAWING

In the accompanying drawings, the preferred embodiment of the invention and preferred methods of practicing the invention are illustrated in which.

DETAILED DESCRIPTION

Figure 1:
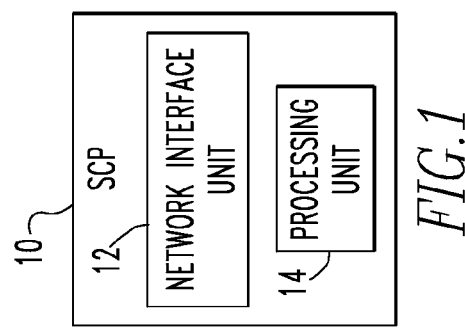
FIG. 1 is a flow diagram regarding the present invention.
Figure 2:
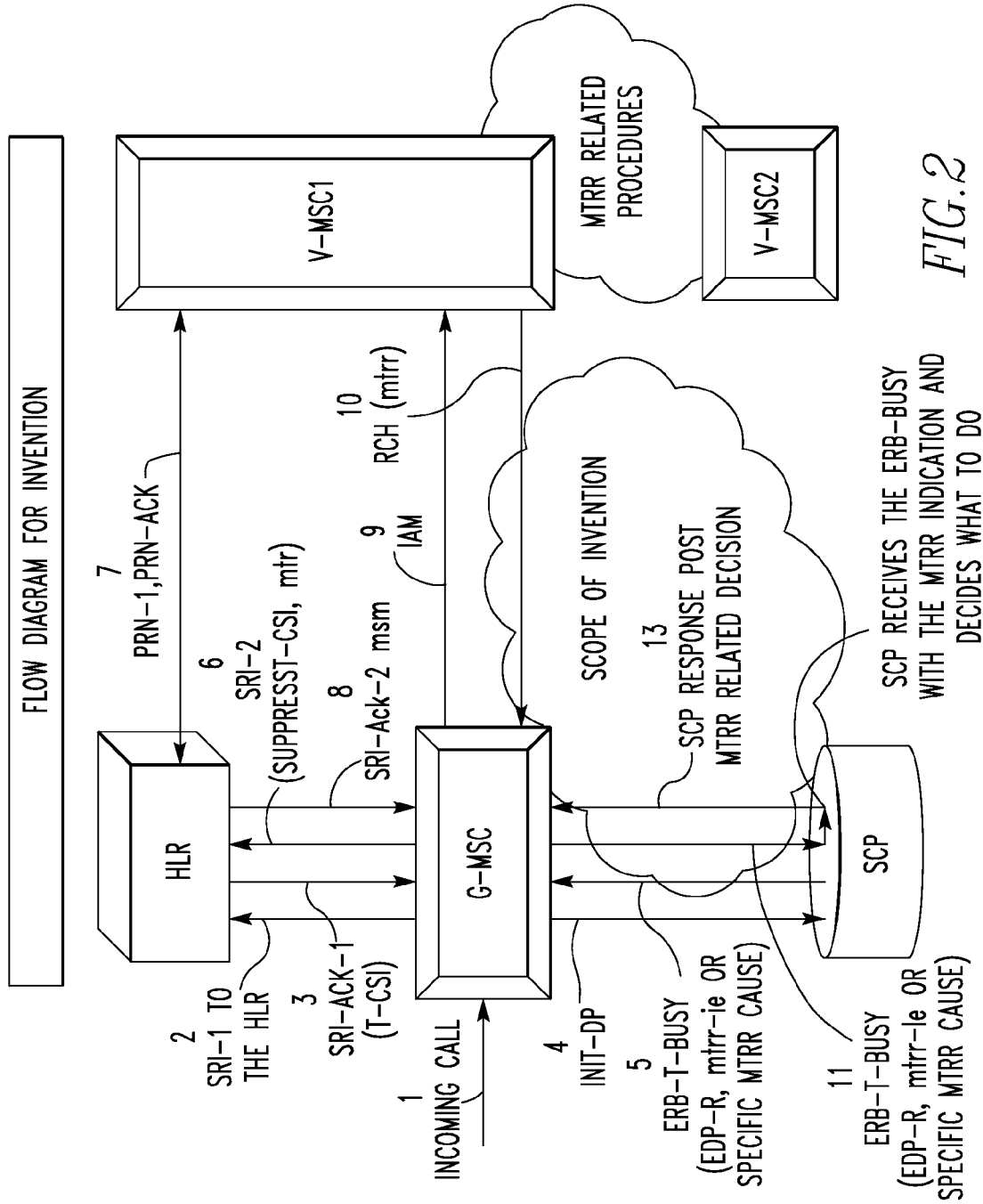
FIG. 2 is a block diagram of an SCP of the present invention.

Referring now to the drawings wherein like reference numerals refer to similar or identical parts throughout the several views, and more specifically to FIG. 2 thereof, there is shown an SCP 10 of a telecommunications network having a GMSC. The SCP 10 comprises a network interface unit 12 of the SCP 10 that receives a CAMEL transaction from the GMSC. The SCP 10 comprises a processing unit 14 of the SCP 10 which controls the CAMEL transaction relinquished by the GMSC and decides whether or not to idle the CAMEL transaction during MTRR.

The network interface unit 12 may receive an EDP-T-BUSY message and the processing unit 14 decides whether to release the transaction, terminate the transaction or continue with the transaction based on the EDP-T-BUSY message. The EDP-T-BUSY message may be in a form of a request and has an appropriate cause value indicating MTRR was encountered at the GMSC.

The processing unit 14 may send through the network interface unit 12 a CAP defined operation called RELEASE CALL to release the transaction. The processing unit 14 may rearm the EDP message and sends through the network interface unit 12 a CONTINUE message having a suppress T-CSI indication so as not to retrigger CAMEL for the transaction and so the transaction will continue. The processing unit 14 may send through the network interface unit 12 an END message to terminate the transaction and cause the GMSC to retrigger and HLR without CAMEL suppression.

The present invention pertains to a method for guiding a CAMEL transaction by an SCP 10 during MTRR. The method comprises the steps of receiving at a network interface unit 12 of the SCP 10 a CAMEL transaction from a GMSC. There is the step of deciding by a processing unit 14 of the SCP 10 which controls the CAMEL transaction relinquished by the GMSC whether or not to idle the CAMEL transaction during MTRR.

There may be the steps of the network interface unit 12 receiving an EDP-T-BUSY message and the processing unit 14 deciding whether to release the transaction, terminate the transaction or continue with the transaction based on the EDP-T-BUSY message. The EDP-T-BUSY message may be in a form of a request and has an appropriate cause value indicating MTRR was encountered at the GMSC.

There may be the step of the processing unit 14 sending through the network interface unit 12 a CAP defined operation called RELEASE CALL to release the transaction. There may be the steps of the processing unit 14 rearming the EDP message and sending through the network interface unit 12 a CONTINUE message having a suppress T-CSI indication so as not to retrigger CAMEL for the transaction and so the transaction will continue. There may be the step of the processing unit 14 sending through the network interface unit 12 an END message to terminate the transaction and cause the GMSC to retrigger and HLR without CAMEL suppression.

In the operation of the invention, the present invention provides for:
1. render control to the SCP 10 to decide if the transaction should be idled or not by using basic end;
2. trigger MTRR using the catch-all EDP T-EDP-BUSY;
3. define a cause value to be used in the reporting of EDP-BUSY to indicate to the SCP 10 that this report is due to MTRR or include the MTRR IE already defined in the MAP specifications;
4. provide mechanism to Release the transaction only from the SCP 10 and leave the call unaffected;
5. provide a mechanism to continue with the call post indication of MTRR via EDP-BUSY reporting.

In GSM/UMTS a basic mobile termination call irrespective of the originator goes through a GMSC who queries the HLR to download subscription information and the current location of the mobile subscriber.

This is done via a 3GPP MAP defined method called SRI which is responded to by the HLR with an SRI-Ack. This SRI-Ack can contain a roaming number to terminate to the mobile in the right VMSC where the UE is roaming, or can come back with CAMEL information in the form of T-CSI (I am intentionally not involving other CAMEL information that can also be downloaded to keep the scenario simple).

When CAMEL information is downloaded, a CAMEL trigger using CAP protocol is done towards the SCP 10. This provides the SCP 10 to run some services on behalf of the actual terminator (example: terminating prepaid, personalized numbering system, caller ringback tone, etc.).

Post the receipt of the trigger SCP 10 can actually decide what to do with the call. Either due to some service let the call terminate as is, or forward the call, or connect to an IP IVR, or release the call, or monitor the call for answer and disconnect to charge appropriately, or based on location of the subscriber connect the caller to some other number, any such decision is achieved via sending of an operation defined by the CAP (3gPP 29.078) protocol.

In one embodiment, the decision of the SCP 10 is to continue terminating to the same subscriber but monitor the call (i.e. possibly for answer and disconnect events on the basic call). This causes the GMSC to receive the CONTINUE (CAP operation) from the SCP 10 preceded by the arming of detection points for answer and disconnect (via CAP operation RRBE).

The receipt of the CONTINUE operation by the GMSC results in sending another SRI to the HLR (but asking HLR not to send back the same CAMEL information indicated via CAMEL suppression parameter (defined by MAP 3GPP 29.002).

This results in the HLR sending a roaming number extraction message to the V-MSC (where the UE is roaming currently) and receiving the roaming number back from the V-MSC. The HLR in turn sends the roaming number to the GMSC in the message SRI-Ack, as mentioned before.

Upon receipt of the roaming number the GMSC extends the call to the V-MSC over the interconnect protocol between the G-MSC and the V-MSC.

When the V-MSC receives the call it starts to page the UE. While paging has been started, the UE might actually have decided to fallback (CSFB-3GPP 23.272) to another V-MSCn. This results in the HLR being notified by the new V-MSCn that CSFB is going on. This prompts the HLR to send either a CANCEL location to the old V-MSC (or SEND-ID is received by the old VMSC in case of supercharger).

The old V-MSC then sends back an RCH (resume call handling) to the GMSC. The RCH message is the same that is used for optimal routing functionality but with indications of MTRR.

Upon receipt of this the GMSC that was running a CAMEL transaction on behalf of the real terminator, idles the CAMEL transaction and restarts a new one by downloading the CAMEL information again via the triggering of SRI (without camel suppression indication).

This causes the CAMEL transaction to restart.

This invention does not change up until the RCH method receipt at the GMSC.

Once the RCH is received instead of reporting ERB-Abandon to the SCP 10 this disclosure recommends to report ERB-T-BUSY.

EDP T-BUSY should always be armed in the form of Request (and not notification). EDP-T-BUSY should be populated with an appropriate cause value indicating MTRR was encountered at the GMSC (due to the receipt of RCH specific to MTRR).

SCP 10, the controller of the service can now decide what should be the fate of the call. Either release the call, or continue with the call or terminate the transaction.

Case 1: Release the Call

SCP 10 can send a CAP defined operation called RELEASE CALL to achieve this.

Case 2: Continue with the Call and Not Retrigger

SCP 10 can rearm EDPs as some would have been disarmed upon reporting T-BUSY and send back a CONTINUE (or CONTINUE with arguments).

Because SSF knows that the trigger was for MTRR, the receipt of CONTINUE allows the call to proceed unaltered.

Case 3: Idle the Transaction

SCP 10 can send a basic end to terminate the transaction. This would cause the GMSC to retrigger SRI towards the HLR without CAMEL suppression.

The present invention prevents reporting of the incorrect EDP Previously, the EDP being reported erroneously indicated that the calling party has prematurely abandoned the call, by reporting EDP-Abandon. The present invention corrects this problem by providing the correct EDP report to the SCP and thereby allows the SCP to control the fate of the call.

In the present invention, the cause value can be replaced by MTRR indication as is used in the RCH message and other MAP messages like SRI to indicate MTRR was encountered. Instead of relying on the cause value, a special parameter can be put in the extension container that will safely interwork with any node (who will ignore this parameter if it is not understood). This provides another means of communicating from the GMSC to the SCP that MTRR has taken place.

The present invention prevents creation of more basic call models on the GMSC. By releasing the call and creating another trigger for the same terminating subscriber, it is possible to use up more resources on the triggering node the GMSC by creating more call models. With the present invention, with the control provided to the SCP to decide if the transaction should continue or not, this extra resource utilization can be reduced by reusing the same call model to continue the call.

The present invention prevents excessive billing information. The creation of call models results in the generation of billing information from each call model. This can be reduced as well with the present invention.

The present invention allows for the use of the same call reference number to correlate billing in the downstream billing processor. When billing is generated, a unique number is used to correlate the billing being generated from different nodes. By means of this idea, using the same unique number results in easier correlation than what currently exists, where for a single call and for a single party multiple billing correlation numbers are generated.

Specifications related changes in regard to the present invention.
1. MTRR IE to be added in the Event Report BCSM state machine method. Affected specifications 3GPP 23.078, 29.078. Reporting of T-BUSY due to MTRR in 23.078. Support of MTRR IE in the CAP protocol in 29.078. The parameter is being proposed as optional. For backwards compatibility nodes adhering to this invention can continue to follow the same process as today, which is reporting of EDP-Abandon.
2. Basic call handling 3GPP 23.018-based on this invention if the initial CAMEL transaction is maintained even during MTRR, then the SRI following the procedures of MTRR, will contain suppress T-CSI indication so as not to retrigger CAMEL for the same party from the GMSC. The inclusion of triggering of the T-BUSY EDP also has to be shown.
3. 3GPP 23.272 CS fallback—changes similar to 3GPP 23.018 has to be reflected in the MTRR procedures.

Advantages of the Invention
1. Prevents reporting of the incorrect EDP.
2. Reporting the information correctly via T-BUSY (with appropriate cause value). The cause value can be a mutual agreement between different nodes.
3. The cause value can be replaced by MTRR indication as is used in the RCH message and other MAP messages like SRI to indicate MTRR was encountered.
4. Prevents creation of more basic call models on the GMSC.
5. Prevents excessive billing information.
6. Re-use of the same call reference number to correlate billing in the downstream billing processor.
7. Provides a control on the service logic basis whether to idle CAMEL transaction or not.

Abbreviations
GMSC—Gateway Mobile Switching Centre
HLR—Home Location Register
SCP—Service Control Point
ERB—Event Report BCSM
BCSM—Basic Call State machine
MTRR—Mobile Terminated Roaming Retry
SRI—Send Routing Information
RCH—Resume Call handling
EDP—Event Detection Point
RRB—Request Report BCSM
MSC—Mobile Switching Centre
V-MSC—Visited MSC
CAP—CAMEL Application protocol
CAMEL—Customized Application for Mobile Enhanced Logic
MAP—mobile application protocol
SSF—Service Switching Function References, All of Which Are Incorporated by Reference
3GPP 29.002
3GPP 23.272
3GPP 23.078

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A Service Control Point (SCP) of a telecommunications network having a Gateway Mobile Switching Centre (GMSC) comprising:
   a network interface unit of the SCP that receives a Customized Application for Mobile Enhanced Logic (CAMEL) transaction between a caller and a called subscriber from the GMSC; and
   a processing unit of the SCP which controls the CAMEL transaction relinquished by the GMSC and decides, based at least partially on a location of the called subscriber, whether or not to idle the CAMEL transaction during Mobile Terminated Roaming Retry (MTRR).

2. The SCP of claim 1 wherein the network interface unit receives an Event Detection Point (EDP)-T-BUSY message and the processing unit decides whether to release the transaction, terminate the transaction or continue with the transaction based on the EDP-T-BUSY message.

3. The SCP of claim 2 wherein the EDP-T-BUSY message is in a form of a request and has an appropriate cause value indicating MTRR was encountered at the GMSC.

4. The SCP of claim 2 wherein the processing unit sends through the network interface unit a CAP defined operation called RELEASE CALL to release the transaction.

5. The SCP of claim 2 wherein the processing unit rearms the EDP message and sends through the network interface unit a CONTINUE message having a suppress T-CSI indication so as not to retrigger CAMEL for the transaction and so the transaction will continue.

6. The SCP of claim 2 wherein the processing unit sends through the network interface unit an END message to terminate the transaction and cause the GMSC to retrigger an HLR without CAMEL suppression.

7. A method for guiding a Customized Application for Mobile Enhanced Logic (CAMEL) transaction by a Service Control Point (SCP) during Mobile Terminated Roaming Retry (MTRR) comprising the steps of:
   receiving at a network interface unit of the SCP a CAMEL transaction between a caller and a called subscriber from an Gateway Mobile Switching Centre (GMSC); and
   deciding, based at least partially on a location of the called subscriber, by a processing unit of the SCP which controls the CAMEL transaction relinquished by the GMSC whether or not to idle the CAMEL transaction during MTRR.

8. The method of claim 7 including the steps of the network interface unit receiving an Event Detection Point (EDP)-T-BUSY message and the processing unit deciding whether to release the transaction, terminate the transaction or continue with the transaction based on the EDP-T-BUSY message.

9. The method of claim 7 wherein the EDP-T-BUSY message is in a form of a request and has an appropriate cause value indicating MTRR was encountered at the GMSC.

10. The method of claim 7 including the step of the processing unit sending through the network interface unit a CAP defined operation called RELEASE CALL to release the transaction.

11. The method of claim 7 including the steps of the processing unit rearming the EDP message and sending through the network interface unit a CONTINUE message having a suppress T-CSI indication so as not to retrigger CAMEL for the transaction and so the transaction will continue.

12. The method of claim 7 including the step of the processing unit sending through the network interface unit an END message to terminate the transaction and cause the GMSC to retrigger and HLR without CAMEL suppression.

* * * * *